United States Patent
Chiou et al.

(10) Patent No.: US 8,676,196 B2
(45) Date of Patent: Mar. 18, 2014

(54) APPARATUS AND METHOD FOR COMPETITOR NETWORK MONITORING

(76) Inventors: Ta-Gang Chiou, Taipei (TW); Chao-Chi Chang, Taipei (TW); Hsiao-Tse Chang, Taipei (TW)

( * ) Notice: Subject to any disclaimer, the term of this patent is extended or adjusted under 35 U.S.C. 154(b) by 0 days.

(21) Appl. No.: 13/306,724

(22) Filed: Nov. 29, 2011

(65) Prior Publication Data

US 2012/0135729 A1 May 31, 2012

Related U.S. Application Data

(60) Provisional application No. 61/458,661, filed on Nov. 30, 2010.

(51) Int. Cl.
*H04W 4/00* (2009.01)

(52) U.S. Cl.
USPC ........... 455/434; 455/436; 455/437; 455/438; 455/440; 455/448

(58) Field of Classification Search
USPC .................. 455/434, 436, 437, 438, 440, 448
See application file for complete search history.

(56) References Cited

U.S. PATENT DOCUMENTS

| | | | |
|---|---|---|---|
| 2008/0056214 A1* | 3/2008 | Low et al. ...................... 370/338 |
| 2010/0227598 A1* | 9/2010 | Roach ............................ 455/417 |
| 2011/0035420 A1* | 2/2011 | Alizadeh-Shabdiz et al. ............................ 707/812 |
| 2012/0046040 A1* | 2/2012 | Chatterjee .................. 455/456.1 |
| 2012/0129533 A1* | 5/2012 | Karaoguz et al. ............. 455/437 |

* cited by examiner

*Primary Examiner* — Barry Taylor (57) ABSTRACT

A method and an apparatus for competitor network monitoring, which enables mobile operators to learn about other networks' RF performance, including signal strength, interference, etc. This method changes the normal mobile phone behaviors to utilize its spectrum scan capability to scan competitor networks' RF situation at the mobile phones' idle time slots, i.e. those time slots it does not need to listen to its own network. Associated these collected competitor networks' RF performance data with the location where these data are collected by the means the implementers preferred and gathered the associated competitor network data and correspondent location information at the server, mobile operators can utilize these gathered competitor networks data and compare with their own network to learn about where they have better or worse performance as indication for their own network improvement tasks.

14 Claims, 4 Drawing Sheets

APPARATUS AND METHOD FOR COMPETITOR NETWORK MONITORING

BACKGROUND OF INVENTION

1. Field of the Invention

The invention is related to a method that utilizes the spectrum scan capability of mobile phones to scan for competitors' and domestic roaming partners' networks in order to obtain the performance information regarding to the competitors' and domestic roaming partners' networks.

2. Description of the Prior Art

Mobile operators are interested in learning how other nearby mobile networks, such as competitors' and domestic roaming partners' networks, perform compared to their own network. Currently, operators collect competitors' networks performance information by conducting drive tests, which requires SIM/USIM cards or subscriptions from each competitor. This method is hard to scale up both temporally and spatially. This patent proposes an apparatus and method to offer a solution for mobile operators and users to achieve this goal and this method and apparatus can apply to different generation of mobile network, including GSM/GPRS/EDGE, CDMA 2000/EVDO, UMTS/HSPA, WiMax, LTE, LTE-A, and so on.

SUMMARY OF THE INVENTION

Accordingly, it is an objective of the present invention to provide an apparatus and a method for competitor network monitoring, which utilizes the spectrum scan capability of mobile phones to scan for competitors' networks in order to obtain the performance information regarding to the competitors' networks, without the need to perform drive tests nor to acquire SIM/USIM cards or subscriptions from each competitor. Thus, the monitoring of competitor networks can be done in a much time-saving and labor-saving way and can also be done in large spatial and temporal scale.

In order to achieve aforementioned objective, the present invention discloses an apparatus and a method for competitor network monitoring. The method is implemented in a communication system that comprises at least a mobile device capable of registering to a first mobile network. The method comprises the following steps:

step (A): utilizing the mobile device to perform a spectrum scan for scanning at least a second mobile network other than the first mobile network and obtaining a scanned data about at least the second mobile network; step (B): the mobile device storing the scanned data into a memory furnished inside the mobile device; and step (C): collecting the scanned data from the mobile device for analyzing in a server.

In a preferred embodiment, the scanned data either is collected by one of the following ways: I) the scanned data is sent by the mobile device to the server remotely; or II) the scanned data is downloaded from the mobile device to a memory device and then the server collects the scanned data from the memory device.

In a preferred embodiment, the first and second mobile networks comply with at least one of the following communication protocols: GSM, GPRS, EDGE, CDMA 2000, EVDO, UMTS, HSPA, WiMax, LTE, and LTE-A. The mobile device is equipped with a subscription (such like but not limited to a SIM card, a USIM card or other means of subscriptions) which allows the mobile device to register to the first mobile network and uses the communication services provided by the first mobile network, but the subscription does not allow the mobile device to register to at least the second mobile network. The scanned data includes the following information of at least the second mobile network: MNC (mobile network code), cell id, signal strength, and interference.

In a preferred embodiment, the step (A) further comprises the following steps: (A1) the mobile device registering to the first mobile network; (A2) the mobile device reading network configuration of the first mobile network and camping on a first RF channel belonging to the first mobile network; (A3) the mobile device entering a sleep mode; (A4) during the sleep mode, the mobile device initiating the spectrum scan and tuning its scanning spectrum to other RF channels other than the first RF channel, once finding a second RF channel that belongs to the second mobile network, the mobile device scanning the second RF channel and obtaining the scanned data about the second mobile network; (A5) the mobile device tuning back to the first RF channel and listening to the first mobile network.

In a preferred embodiment, the step (A) further comprises the following step: the mobile device obtaining a geographical information about where the mobile device is located when performing the spectrum scan; the scanned data including the geographical information.

In a preferred embodiment, the geographical information is obtained by using one of the following ways: utilizing a GPS module built-in the mobile device to obtain the geographical information of the mobile device by using GPS latitude and longitude information; utilizing a wifi module built-in the mobile device to obtain the geographical information of the mobile device by using a wifi based geolocation feature; and utilizing a mobile network information of the first mobile network to obtain the geographical information of the mobile device.

In a preferred embodiment, when the geographical information is obtained by utilizing the mobile network information of the first mobile network, the geographical information is obtained during at least one of the following time points: when the mobile device has just connected to the first mobile network, such as making or receiving a voice call, the last spectrum scan right before the connection is associated with the location where the mobile device connected to the first mobile network; when the mobile device has just disconnected from the first mobile network, the mobile device makes a spectrum scan right after the mobile device disconnected from the first mobile network and then associates with the location where the mobile device disconnected from the first mobile network; wherein, the association between the scanned data obtained by the spectrum scan and the location is done in the server by using positioning algorithms including one of the following: triangulation and multi-lateration.

In a preferred embodiment, the scanned data is sent to the server remotely upon at least one of the following circumstances: when a user of the mobile device triggers a function to send the scanned data to the server; when the mobile device drops a call, the mobile device reports a drop event to the server as well as sends the scanned data to the server at the same time; when the mobile device is disconnected from the first mobile network for a predetermined period of time and then re-connects to the first mobile network again, the mobile device sends the scanned data to the server; and when the mobile device is connected to a power source for charging electricity, the mobile device sends the scanned data to the server.

BRIEF DESCRIPTION OF THE DRAWINGS

The present invention will now be specified with reference to its preferred embodiment illustrated in the drawings, in which.

DESCRIPTION OF THE PREFERRED EMBODIMENT

This patent achieves the goal, i.e. monitoring the performance of nearby mobile networks, such as competitors' and domestic roaming partners' networks, in large spatial and temporal scale, by utilizing mobile phone capabilities and modifying mobile phone normal behaviors accordingly and combines with geolocation solutions.

One capability this patent is utilizing is the spectrum scan capability of the mobile phone (also referred as "mobile device" hereinafter). Most modern mobile phones are capable of scanning the spectrums they are designed to use, and they will utilize the scanned network information to determine camping on the network they are authorized to register. During the spectrum scan stage, though the mobile phones can not register to those networks they are not allowed to, they still can obtain certain information about those networks, including mobile network code (MNC), cell id, signal strength, interference, etc. Also, the normal behavior of the spectrum scan is that once the mobile phone found the network it's allowed to camp on, it will register to the network and keep listening to the radio frequency (RF) channels belong to that registered network, and it will not conduct the spectrum unless 1) users specifically trigger this function or 2) users enter some areas without the coverage, so the mobile phone will try to scan the full spectrum to regain the network information.

The second attribute this patent is utilizing is mobile phones' idle time slot. When mobile phones are in idle mode, they are not always awake (and do not need to either) to listen to the registered network because the registered network broadcast information or page mobile phones in certain negotiated time slot. In other words, the normal behavior of idle mode mobile phones is that they awake only at certain time slots to retrieve necessary information from the registered network.

This patent leverages abovementioned two mobile phone attributes and alters mobile phones' normal behaviors to turn normal mobile phones into networks performance analysis devices able of monitoring other networks, such as competitors' and domestic roaming partners' networks (ps. the competitors' and domestic roaming partners' networks are also referred as "the second mobile network" hereinafter). To utilize abovementioned mobile phones attributes and modify mobile phones behaviors, a special version of firmware is needed to alter the mobile phones' normal behaviors and take the advantage of those mobile phones capabilities. In this special firmware, when the mobile phone is in the idle mode and not in the slot that it should listen to the registered network (ps. the registered network is also referred as "the first mobile network" hereinafter), this firmware tunes the RF related components to listen to other networks' channels, such as a competitor network's channel or a domestic roaming partners' channel. Taking UMTS as example, a mobile phone with this special firmware and a SIM, which is allowed to camp on the operator X's network with UTRA Absolute Radio Frequency Channel Number (UARFCN)—10562, 10563, and 10564—and is currently camped on the UARFCN 10562 (also referred as "the first RF channel" hereinafter). Based on the network configuration, this phone should wake up at (toff+N×t1) while toff is a time offset from current time point, N is integer from 0 to unlimited, and t1 is the wake up period. In other words, this mobile phone should wake up every t1 time unit to listen to the registered network's information. Once this special firmware learned about this configuration, it can schedule the RF related components to jump to other UARFCN to learn about the RF situation in another UARFCN, such as 10601 which belongs to competitors' network, before the next time point that the mobile phone needs to tune back to UARFCN 10562 to listen to the registered network's information. In addition, some operators tends to make their competitors' network channels into a blacklist pre-stored in their SIM/USIM cards in order to restrain their customers from roaming or camping on their competitors' network channels. In a preferred embodiment of the present invention, the special firmware run in the mobile device can retrieve such blacklist from the SIM/USIM card equipped therein, and then directly scan these blacklisted channels for collecting network information, such that the time and energy for performing the spectrum scan as well as information collections will be significantly reduced.

Figure 1:
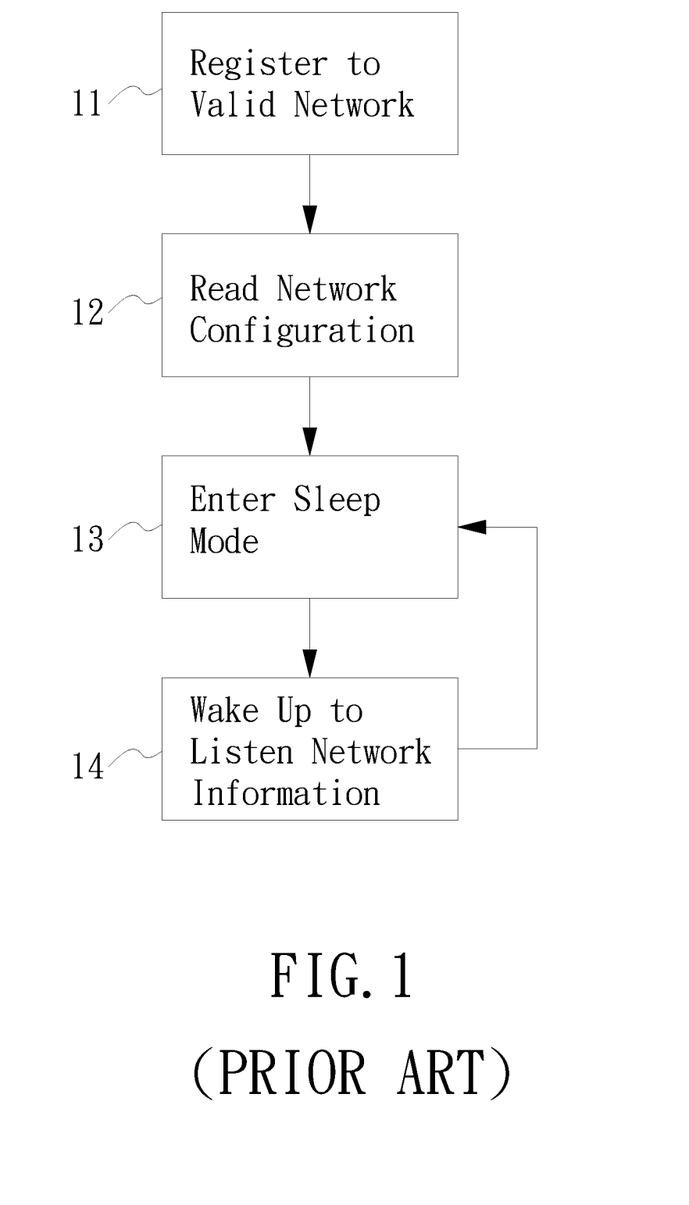
FIG. 1 shows a simplified flow of original RF monitoring process according to a prior art mobile phones' normal behavior.
Figure 2:
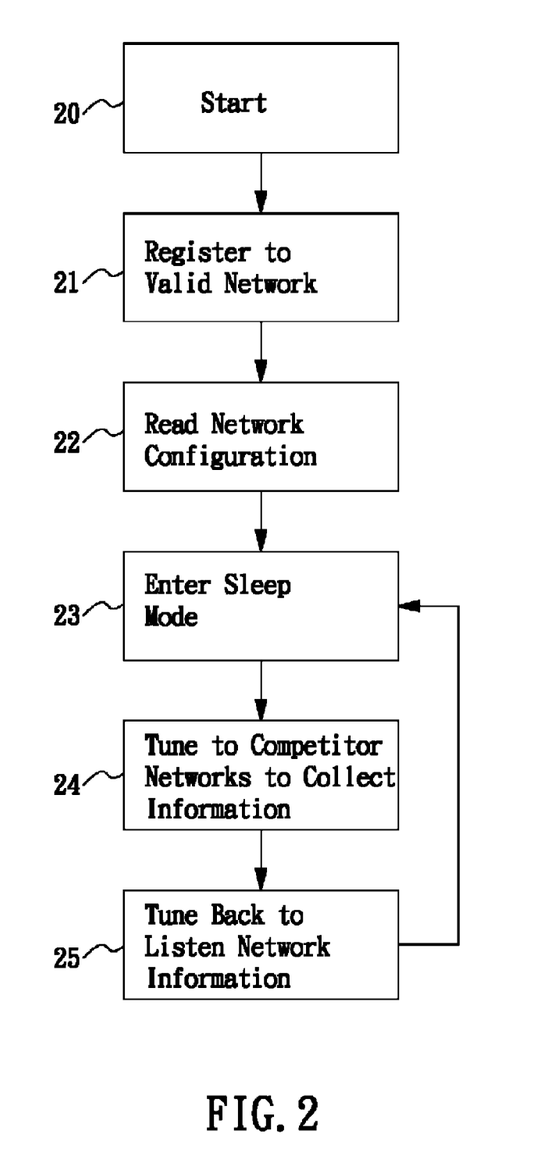
FIG. 2 shows a simplified flow of modified RF monitoring process of mobile phones according to the present invention.

Please refer to FIG. 1 and FIG. 2. FIG. 1 and FIG. 2 show a simplified flow comparison about the original and modified RF monitoring process, while the modified processes may vary based on the different embodiments, but the logic will be similar. FIG. 1 shows a simplified flow of original RF monitoring process according to a prior art mobile phones' normal behavior, which comprises the steps of: registering to a valid mobile network (step 11); reading the network configuration of the registered mobile network (step 12); entering sleep mode (i.e., idle mode) (step 13); waking up to listen the network information of registered mobile network (step 14); and then go back to the sleep mode of step 13. FIG. 2 shows a simplified flow of modified RF monitoring process of mobile phones according to the present invention, which comprises the steps of: starting the mobile device (step 20); registering to a valid mobile network, that is, the first mobile network (step 21); reading the network configuration of the registered first mobile network (step 22); entering sleep mode (i.e., idle mode) (step 23); tuning to competitors' networks (e.g., the second mobile network) to collect network information (e.g., scanned data) (step 24); waking up to listen the network information of registered first mobile network (step 25); and then go back to the sleep mode of step 23. The key competitor network information can be and should be collected includes MNC, cell id, signal strength, interference, and other RF related information (ps. the collected competitor's network information is also referred as "scanned data" hereinafter). Also, this action, i.e. scanning competitors' network RF performance, in the UMTS mobile network can not be done during the connected mode, such as in a voice call or in active PS session, because the RF components are occupied by the connection unless the mobile phone equipped more than one set of RF components.

To understand competitors' network performance, geographical information is another important aspect in addition to RF information. Geographical information can make the comparison more useful because measured performance in the same geographical area can be compared together. Therefore, how to associate collected competitor RF information with geographical information is another important part of this patent. The geographical information can be rough indicators, such as MNC or cell ID, or can be more precise location identified or calculated based on available data. Several methods to get or calculate geographical information related to collected competitor network information are listed in following sections while some of the embodiments will be explained in details.

The first method to get geographical information is to get it from the mobile phone itself directly if the mobile phone is equipped with a positioning device, such as a GPS. In this case, the mobile phone just needs to associate the GPS latitude and longitude information with the competitor network RF data collected at the same or nearby time point. The second method is to utilize wifi based geolocation method if the mobile phone is equipped with wifi capability. In general, wifi based geolocation method is to use the sensed wifi network information to determine the mobile phone's location. Both the GPS and wifi based geolocation methods do not rely on mobile network's information, so they can be used to collect competitor network RF performance information as long as the mobile phone's RF component are free to use, for example the mobile phone is in idle mode or the mobile phone has more than one set of RF components. Another method is to utilize the mobile network information to locate the mobile phone. Certain network measurement information which is available when the mobile phone is in active mode, i.e. connected to the mobile network, can be helpful for calculating the location. For example, "radio measurement" is one of the network measurement information that is useful for calculating the location of mobile device. The position of mobile device can be calculated based on radio measurement (such as but not limited to: RSCP, EcNo, propagation delay, TM-offset, chip, etc.) either on the mobile device side, or on the server side. It's also possible to transmit radio measurement from the mobile device to the server, and then calculate the position based on the radio measurement on the server. The server can also get the radio measurement from the network side, such as from UMTS's RNC event logs or LTE's eNode-B dump of signaling events, instead of directly from the mobile device. The RNC event logs or eNode-B dump of signaling events basically already collect information transmitted from mobile devices to the network side. Therefore the measurement is still indirectly from the mobile device.

To get such measurement information when the cell phone is in active mode, possible time points to associate the scanned competitor network RF performance information with the mobile phone's location are 1) when the mobile phone just connected to the network, such as making/receiving a voice call, and 2) when the mobile phone just disconnected from the network. In the 1) situation, the last competitor network performance scan before the connection can be associated with the location where the mobile phone connected to the network, while the mobile phone can make a competitor network scan right after the mobile phone disconnected from its own network and associate the scan and the disconnected location. Because the mobile network measurement based method needs the mobile network topology information, the association between collected competitor network scan and the location is recommended to be done in the network side. Positioning algorithms such as triangulation, multi-lateration (such like tri-lateration and etc.) can then be applied to calculate the location.

When many modified mobile phones are deployed or sold to the market, all these mobile phones become devices capable of capturing competitor networks' RF performance information. In actual usage scenario, operator can choose to install or enable such feature for all users or only for mobile phones used by selected users such as trial users, its own staff, or corporate users. The feature can run autonomously or only be triggered on demand, such as when a user submits a complaint with a customer complaint program on the mobile phone and agrees to provide operator with measurement data. The more this kind of mobile phones are used in the network spatial and temporally the more complete competitor networks' RF performance is. Therefore, after collected the scanned competitor network data and associated location information about those scans at the server side, the mobile operator can plot those collected competitor network data on the map and compare with its own network's performance in different area and different time.

Figure 3:
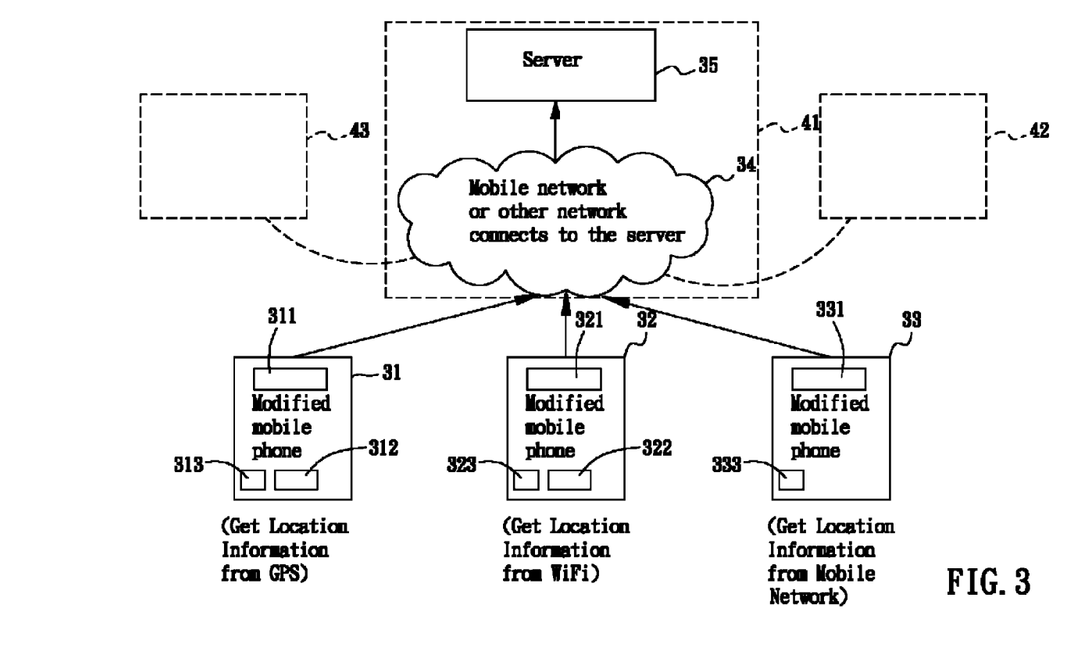
FIG. 3 illustrates an embodiment of architecture of the mobile devices for competitor network monitoring according to the present invention.
Figure 4:
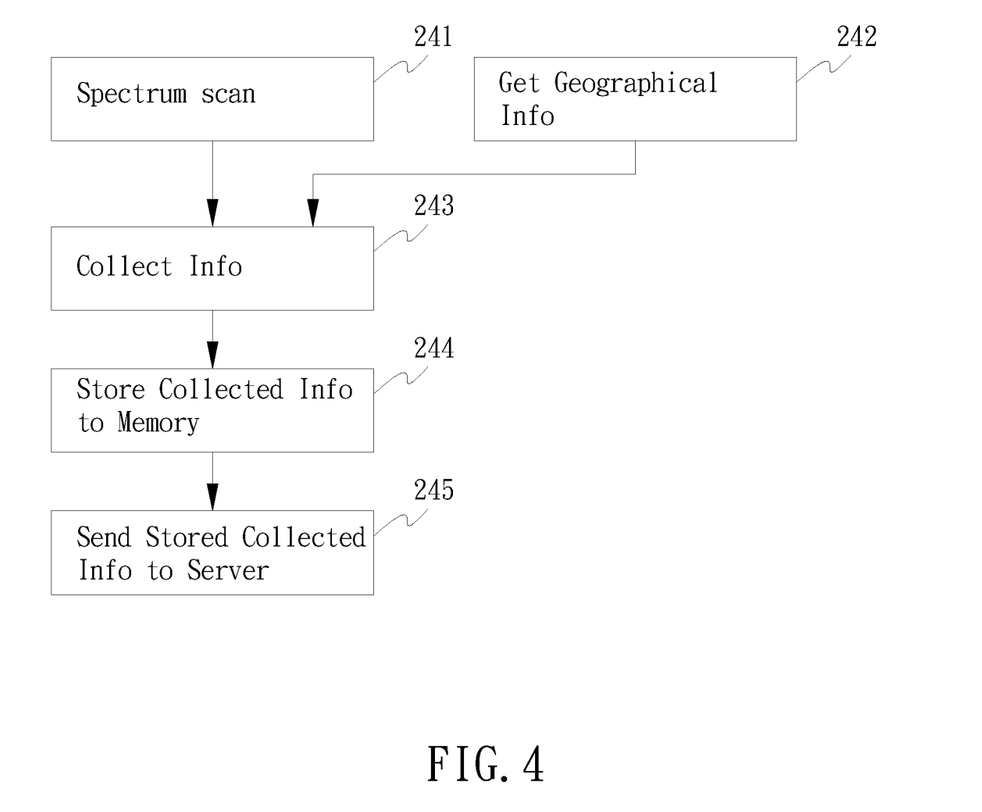
FIG. 4 shows an embodiment of flow for performing the RF monitoring process according to the present invention.

Please refer to FIG. 3 and FIG. 4. FIG. 3 illustrates an embodiment of architecture of the mobile devices for competitor network monitoring according to the present invention. FIG. 4 shows an embodiment of flow for performing the RF monitoring process according to the present invention. In this embodiment, the apparatus and method for competitor network monitoring of the present invention is implemented in a communication system that comprises a plurality of mobile devices 31, 32, 33 capable of registering to a first mobile network 41. There are some other networks (such as the second mobile networks 42, 43) other than the first mobile network existing in the communication system. Each mobile device 31, 32, 33 is equipped with a subscription (such as SIM card, a USIM card or other means of subscriptions) 311, 321, 331 which allows the mobile device 31, 32, 33 to register to the first mobile network 41 and uses the communication services provided by the first mobile network 41, but the subscription 311, 321, 331 does not allow the mobile device 31, 32, 33 to register to the second mobile networks 42, 43. In a preferred embodiment, the first and second mobile networks 41, 42, 43 comply with at least one of the following communication protocols: GSM, GPRS, EDGE, CDMA 2000, EVDO, UMTS, HSPA, WiMax, LTE, and LTE-A.

Each mobile device 31, 32, 33 is capable of performing the RF monitoring process as previously described in the FIG. 2. Especially in the step 24, the step 24 for collecting the second mobile network's 42, 43 information further includes the following steps.

Step (A): utilizes the mobile device 31, 32, 33 to perform a spectrum scan (step 241) for scanning at least a second mobile network 42, 43 other than the first mobile network 41 and obtaining a scanned data (step 242) about at least the second mobile network 42, 43. Wherein, the step (A) further comprising the following steps: (A1) the mobile device 31, 32, 33 registering to the first mobile network 41; (A2) the mobile device 31, 32, 33 reading network configuration of the first mobile network 41 and camping on a first RF channel belonging to the first mobile network 41; (A3) the mobile device 31, 32, 33 entering a sleep mode; (A4) during the sleep mode, the mobile device 31, 32, 33 initiating the spectrum scan and tuning its scanning spectrum to other RF channels other than the first RF channel, once finding a second RF channel that belongs to the second mobile network 42, 43, the mobile device 31, 32, 33 scanning the second RF channel and obtaining the scanned data about the second mobile network 42, 43; and (A5) the mobile device 31, 32, 33 tuning back to the first RF channel and listening to the first mobile network 41. In a preferred embodiment, the scanned data includes the following information of at least the second mobile network 42, 43: MNC (mobile network code), cell id, signal strength, and interference. In addition, the mobile device 31, 32, 33 also obtains a geographical information (step 242) about where the mobile device 31, 32, 33 is located when performing the spectrum scan; wherein, the scanned data includes the geographical information.

Step (B): the mobile device 31, 32, 33 stores the scanned data into a memory 313, 323, 333 furnished inside the mobile device 31, 32, 33 (step 244).

Step (C): the scanned data stored in the mobile device 31, 32, 33 is collected in order to be analyzed in the server 35 (step 245). Wherein, the scanned data either is collected by one of the following ways: I) the scanned data is sent by the mobile device to the server remotely (e.g., via internet, or via the first mobile network 41 or other network 34 connects to the server 35); or II) the scanned data sent is downloaded from the mobile device 31, 32, 33 to a memory device (not shown in figures) and then the server 35 collects the scanned data from the memory device. In this step (C), the scanned data is sent to the server 35 remotely upon at least one of the following circumstances: 1) when a user of the mobile device triggers a function to send the scanned data to the server; 2) when the mobile device drops a call, the mobile device reports a drop event to the server as well as sends the scanned data to the server at the same time; 3) when the mobile device is disconnected from the first mobile network for a predetermined period of time and then re-connects to the first mobile network again, the mobile device sends the scanned data to the server; and 4) when the mobile device is connected to a power source for charging electricity, the mobile device sends the scanned data to the server.

In the step (A), the geographical information is obtained by using one of the following ways: 1) utilizing a GPS module 312 built-in the mobile device 31 to obtain the geographical information of the mobile device 31 by using GPS latitude and longitude information; 2) utilizing a wifi module 322 built-in the mobile device 32 to obtain the geographical information of the mobile device 32 by using a wifi based geolocation feature; and 3) utilizing a mobile network information of the first mobile network 41 to obtain the geographical information of the mobile device 33. Wherein, when the geographical information is obtained by utilizing the mobile network information of the first mobile network 41, the geographical information is obtained during at least one of the following time points: i) when the mobile device 33 has just connected to the first mobile network 41, such as making or receiving a voice call, the last spectrum scan right before the connection is associated with the location where the mobile device 33 connected to the first mobile network 41; and ii) when the mobile device 33 has just disconnected from the first mobile network 41, the mobile device 33 makes a spectrum scan right after the mobile device 33 disconnected from the first mobile network 41 and then associates with the location where the mobile device 33 disconnected from the first mobile network 41. In a preferred embodiment, the association between the scanned data obtained by the spectrum scan and the location is done in the server 35 by using positioning algorithms including one of the following: triangulation and multi—(such as tri-lateration and etc.).

Such scanned data can be used for further analysis. For example, with the competitors cell and signal strength information, as well as the calculated geographical location when the measurement were made, we can approximate the location of the cells or base stations of the competitors, based on positioning algorithms such as reverse triangulation or reverse multi-lateration.

The invention is first implemented on mobile phones, and the invention can be applied to many other handset devices utilizing mobile network, such as iPad, data card, PDA, blackberry, or other devices that utilizes radio frequency of mobile network and monitors the RF spectrum.

This patent proposed a method and an apparatus to enable mobile operators to learn about other networks' RF performance, including signal strength, interference, etc. This proposed method changes the normal mobile phone behaviors to utilize its full spectrum scan capability to scan competitor networks' RF situation at the mobile phones' idle time slots, i.e. those time slots it does not need to listen to its own network. Associated these collected competitor networks' RF performance data with the location where these data are collected by the means the implementers preferred and gathered the associated competitor network data and correspondent location information at the server, mobile operators can utilize these gathered competitor networks data and compare with their own network to learn about where they have better or worse performance as indication for their own network improvement tasks.

While the present invention has been particularly shown and described with reference to a preferred embodiment, it will be understood by those skilled in the art that various changes in form and detail may be without departing from the spirit and scope of the present invention.

What is claimed is:

1. A method for competitor network monitoring, which is implemented in a communication system that comprises at least a mobile device capable of registering to a first mobile network, said method comprising:
   step (A): utilizing said mobile device to perform a spectrum scan for scanning at least a second mobile network other than the first mobile network and obtaining a scanned data about at least the second mobile network;
   step (B): said mobile device storing said scanned data into a memory furnished inside the mobile device; and
   step (C): collecting the scanned data from the mobile device for analyzing in a server;
   wherein said mobile device is equipped with a subscription which allows the mobile device to register to the first mobile network and uses the communication services provided by the first mobile network, but said subscription does not allow the mobile device to register to at least the second mobile network;
   wherein the step (A) further comprising the following steps:
   (A1) said mobile device registering to the first mobile network;
   (A2) said mobile device reading network configuration of the first mobile network and camping on a first RF channel belonging to the first mobile network;
   (A3) said mobile device entering a sleep mode;
   (A4) during said sleep mode, said mobile device initiating said spectrum scan and tuning its scanning spectrum to other RF channels other than the first RF channel, once finding a second RF channel that belongs to the second mobile network, the mobile device scanning said second RF channel and obtaining said scanned data about the second mobile network; in addition, said mobile device obtaining a geographical information about where the mobile device is located when performing said spectrum scan, said scanned data including said geographical information; and
   (A5) said mobile device tuning back to the first RF channel and listening to the first mobile network.

2. The method for competitor network monitoring according to claim 1, wherein said first and second mobile networks comply with at least one of the following communication protocols: GSM, GPRS, EDGE, CDMA 2000, EVDO, UMTS, HSPA, WiMax, LTE, and LTE-A; wherein, the scanned data either is collected by one of the following ways: I) the scanned data is sent by the mobile device to the server remotely; or II) the scanned data is downloaded from the mobile device to a memory device and then the server collects the scanned data from the memory device.

3. The method for competitor network monitoring according to claim 2, wherein, in the step (C), the scanned data is sent by the mobile device to the server remotely upon at least one of the following circumstances:
when a user of the mobile device triggers a function to send the scanned data to the server;
when the mobile device drops a call, the mobile device reports a drop event to the server as well as sends the scanned data to the server at the same time;
when the mobile device is disconnected from the first mobile network for a predetermined period of time and then re-connects to the first mobile network again, the mobile device sends the scanned data to the server; and
when the mobile device is connected to a power source for charging electricity, the mobile device sends the scanned data to the server.

4. The method for competitor network monitoring according to claim 1, wherein said geographical information is obtained by using one of the following ways:
utilizing a GPS module built-in the mobile device to obtain the geographical information of the mobile device by using GPS latitude and longitude information;
utilizing a wifi module built-in the mobile device to obtain the geographical information of the mobile device by using a wifi based geolocation feature;
utilizing a mobile network information of the first mobile network to obtain the geographical information of the mobile device.

5. The method for competitor network monitoring according to claim 4, wherein, when said geographical information is obtained by utilizing the mobile network information of the first mobile network, said geographical information is obtained during at least one of the following time points:
when the mobile device has just connected to the first mobile network, such as making or receiving a voice call, the last spectrum scan right before the connection is associated with the location where the mobile device connected to the first mobile network;
when the mobile device has just disconnected from the first mobile network, the mobile device makes a spectrum scan right after the mobile device disconnected from the first mobile network and then associates with the location where the mobile device disconnected from the first mobile network;
wherein, the association between the scanned data obtained by the spectrum scan and the location is done in the server by using positioning algorithms including one of the following: triangulation and multi-lateration.

6. The method for competitor network monitoring according to claim 1, wherein the scanned data includes the following information of at least the second mobile network: MNC (mobile network code), cell id, signal strength, and interference.

7. The method for competitor network monitoring according to claim 1, wherein the scanned data can be used to approximate the locations of cells or base stations of at least the second mobile network, based on positioning algorithms including one of the following: reverse triangulation and reverse multi-lateration.

8. An apparatus for competitor network monitoring comprising a mobile device capable of registering to a first mobile network, said mobile device performing a competitor network monitoring procedure which comprises the following steps:
step (A): utilizing said mobile device to perform a spectrum scan for scanning at least a second mobile network other than the first mobile network and obtaining a scanned data about at least the second mobile network;
step (B): said mobile device storing said scanned data into a memory furnished inside the mobile device; and
step (C): said mobile device sending said scanned data to a server remote from said mobile device;
wherein said mobile device is equipped with a subscription which allows the mobile device to register to the first mobile network and uses the communication services provided by the first mobile network, but said subscription does not allow the mobile device to register to at least the second mobile network;
wherein the step (A) further comprising the following steps:
(A1) said mobile device registering to the first mobile network;
(A2) said mobile device reading network configuration of the first mobile network and camping on a first RF channel belonging to the first mobile network;
(A3) said mobile device entering a sleep mode;
(A4) during said sleep mode, said mobile device initiating said spectrum scan and tuning its scanning spectrum to other RF channels other than the first RF channel, once finding a second RF channel that belongs to the second mobile network, the mobile device scanning said second RF channel and obtaining said scanned data about the second mobile network; in addition, said mobile device obtaining a geographical information about where the mobile device is located when performing said spectrum scan, said scanned data including said geographical information; and
(A5) said mobile device tuning back to the first RF channel and listening to the first mobile network.

9. The apparatus for competitor network monitoring according to claim 8, wherein:
said first and second mobile networks comply with at least one of the following communication protocols: GSM, GPRS, EDGE, CDMA 2000, EVDO, UMTS, HSPA, WiMax, LTE, and LTE-A; and
said scanned data includes the following information of at least the second mobile network: MNC (mobile network code), cell id, signal strength, and interference.

10. The apparatus for competitor network monitoring according to claim 8, wherein said geographical information is obtained by using one of the following ways:
utilizing a GPS module built-in the mobile device to obtain the geographical information of the mobile device by using GPS latitude and longitude information;
utilizing a wifi module built-in the mobile device to obtain the geographical information of the mobile device by using a wifi based geolocation feature;
utilizing a mobile network information of the first mobile network to obtain the geographical information of the mobile device.

11. The apparatus for competitor network monitoring according to claim 10, wherein, when said geographical information is obtained by utilizing the mobile network information of the first mobile network, said geographical information is obtained during at least one of the following time points:
when the mobile device has just connected to the first mobile network, such as making or receiving a voice call, the last spectrum scan right before the connection is associated with the location where the mobile device connected to the first mobile network;

when the mobile device has just disconnected from the first mobile network, the mobile device makes a spectrum scan right after the mobile device disconnected from the first mobile network and then associates with the location where the mobile device disconnected from the first mobile network;

wherein, the association between the scanned data obtained by the spectrum scan and the location is done in the server by using positioning algorithms including one of the following: triangulation and multi-lateration.

12. The apparatus for competitor network monitoring according to claim 11, wherein, in the step (C), the scanned data is sent to the server upon at least one of the following circumstances:

when a user of the mobile device triggers a function to send the scanned data to the server;

when the mobile device drops a call, the mobile device reports a drop event to the server as well as sends the scanned data to the server at the same time;

when the mobile device is disconnected from the first mobile network for a predetermined period of time and then re-connects to the first mobile network again, the mobile device sends the scanned data to the server; and when the mobile device is connected to a power source for charging electricity, the mobile device sends the scanned data to the server.

13. A method for competitor network monitoring, which is implemented in a communication system that comprises a server and a plurality of mobile devices capable of registering to a first mobile network, said method comprising:

step (A): utilizing each of said mobile devices to perform a spectrum scan for scanning at least a second mobile network other than the first mobile network and obtaining a scanned data about at least the second mobile network;

step (B): each of said mobile devices storing said scanned data into a memory furnished there-inside;

step (C): collecting the scanned data from the mobile device for analyzing in a server; and step (D): said server analyzing the scanned data received from said mobile devices in order to monitor a performance of at least the second mobile network;

wherein said mobile device is equipped with a subscription which allows the mobile device to register to the first mobile network and uses the communication services provided by the first mobile network, but said subscription does not allow the mobile device to register to at least the second mobile network;

wherein the step (A) further comprising the following steps:

(A1) said mobile device registering to the first mobile network;

(A2) said mobile device reading network configuration of the first mobile network and camping on a first RF channel belonging to the first mobile network;

(A3) said mobile device entering a sleep mode;

(A4) during said sleep mode, said mobile device initiating said spectrum scan and tuning its scanning spectrum to other RF channels other than the first RF channel, once finding a second RF channel that belongs to the second mobile network, the mobile device scanning said second RF channel and obtaining said scanned data about the second mobile network; in addition, said mobile device obtaining a geographical information about where the mobile device is located when performing said spectrum scan, said scanned data including said geographical information; and (A5) said mobile device tuning back to the first RF channel and listening to the first mobile network.

14. The method for competitor network monitoring according to claim 13, wherein:

the scanned data includes the following information of at least the second mobile network: MNC (mobile network code), cell id, signal strength, and interference;

the scanned data can be used by the server to approximate the locations of cells or base stations of at least the second mobile network, based on positioning algorithms including one of the following: reverse triangulation and reverse multi-lateration.

* * * * *